United States Patent
Rouquette et al.

(10) Patent No.: US 7,308,035 B2
(45) Date of Patent: Dec. 11, 2007

(54) TRANSIT DIVERSITY WIRELESS COMMUNICATION

(75) Inventors: Stéphanie Pascale Rouquette, Massy (FR); Sandrine Merigeault, Paris (FR)

(73) Assignee: Motorola, Inc., Schaumburg, IL (US)

( * ) Notice: Subject to any disclaimer, the term of this patent is extended or adjusted under 35 U.S.C. 154(b) by 555 days.

(21) Appl. No.: 10/486,474

(22) PCT Filed: Jul. 29, 2002

(86) PCT No.: PCT/EP02/08423

§ 371 (c)(1),
(2), (4) Date: Jul. 27, 2004

(87) PCT Pub. No.: WO03/017528

PCT Pub. Date: Feb. 27, 2003

(65) Prior Publication Data

US 2004/0252779 A1    Dec. 16, 2004

(30) Foreign Application Priority Data

Aug. 13, 2001    (EP) ................................. 01402162

(51) Int. Cl.
*H04B 7/02* (2006.01)
(52) U.S. Cl. ..................... 375/267; 375/299; 375/347
(58) Field of Classification Search ................ 375/267, 375/260, 295, 299
See application file for complete search history.

(56) References Cited

U.S. PATENT DOCUMENTS 6,594,473 B1 * 7/2003 Dabak et al. ............... 455/101

6,865,237 B1 * 3/2005 Boariu et al. ............... 375/295

FOREIGN PATENT DOCUMENTS

EP    1073212 A    1/2001

(Continued)

OTHER PUBLICATIONS

Tirkkonen O et al.: "Minimal non-orthogonality rate 1 space-time block code for 3+ Tx antennas", 2000 IEEE Sixth International Symposium on Spread Spectrum Techniques and Applications. ISSTA 2000, Proceedings (Cat. No. 00TH8536), Proceedings of International IEEE Symposium on Spread Spectrum Techniques and Applications (6th ISSSTA), Parsippany, N. pp. 429-432 vol. 2.

(Continued)

*Primary Examiner*—David C. Payne
*Assistant Examiner*—Rahel Guarino

(57) ABSTRACT

A method of transmitting data from a transmitter (13,24) to a remote receiver (14,28) using transmit diversity wireless communication, the transmitter (13,24) comprising three or more transmit antenna elements (1,2,3,4). The data is encoded in symbol blocks (12), the symbols (s1,s2,s3,s4) of a block (12) being permuted within respective sub-sets of symbols between the transmit antenna elements (1,2,3,4) over time with respective replications and complex conjugations and/or negations. At least one of the sub-sets of said transmit antenna elements (1,2,3,4). The signals transmitted over at least one of the transmit antenna elements (1,2,3,4) are modified as a function of channel information at least approximately related to the channel transfer function (h1, h2,h3 and h4) of the transmitted signals, and the sub-sets of symbols and permuted symbols are permuted over time between said sub-sets of transmit antenna elements, so that the received signal is detectable at the receiver (14,28) using an orthogonal detection matrix scheme.

24 Claims, 2 Drawing Sheets

FOREIGN PATENT DOCUMENTS

| | | |
|---|---|---|
| EP | 1087545 A | 3/2001 |
| WO | WO 00 36764 A | 6/2000 |

OTHER PUBLICATIONS

Hottinen A et al.: "A randomization technique for non-orthogonal space-time block codes", IEEE VTS 53$^{rd}$ Vehicular Technology Conference, Spring 2001. Proceedings (Cat. No. 01CH37202), IEEE VTS 53$^{rd}$ Vehicular Technology Conference, Proceedings, Rhodes, Greece, May 6-9, 2001, pp. 1479-1482 vol. 2, 2001, Piscataway, NJ, USA, IEEE, USA.

Raghothaman B et al.: "Transmit Adative Array Without User-Specific Pilot For 3G CDMA", 2000 IEEE International Conference on Acoustics, Speech, and Signal Processing. Proceedings. (ICASSP). Istanbul, Turkey Jun. 5-9, 2000, IEEE International Conference on Acoustics, Speech and Signal Processing (ICASSP), New York, NY: IEEE, US, vol. 5 of 6, Jun. 5, 2000, pp. 2009-2012.

\* cited by examiner

TRANSIT DIVERSITY WIRELESS COMMUNICATION

This application claims the benefit of prior filed co-pending international application Serial No. PCT/EP02/08423 filed Jul. 29, 2002, and assigned to Motorola, Inc., which was published by the International Bureau on Feb. 27, 2003 under No. WO 03/017528 A1 and European Patent Convention Application No. 01402162.0 filed Aug. 13, 2001.

FIELD OF THE INVENTION

This invention relates to transmission of data by transmit diversity wireless communication.

BACKGROUND OF THE INVENTION

Wireless communication systems are assuming ever-increasing importance for the transmission of data, which is to be understood in its largest sense as covering speech or other sounds and images, for example, as well as abstract digital signals.

Currently proposed standards for wireless communication systems between a stationary base station and a number of remote (mobile or immobile) stations include the 3GPP ($3^{rd}$ generation Partnership Project) and 3GPP2 standards, which use Frequency Division Duplex ('FDD') or Time Division Duplex ('TDD') and Code Division Multiple Access ('CDMA'). The HIPERLAN and HIPERLAN2 local area network standards of the European Telecommunications Standards Institute ('ETSI'), use Time Division Duplex ('TDD') and Orthogonal Frequency Division Multiplex ('OFDM'). The International Telecommunications Union ('ITU') IMT-2000 standards also use various multiplex techniques of these kinds. The present invention is applicable to systems of these kinds and other wireless communication systems.

In order to improve the communication capacity of the systems while reducing the sensitivity of the systems to noise and interference and limiting the power of the transmissions, various techniques are used separately or in combination, including space diversity, where the same data is transmitted over different physical paths interleaved in time, in particular over different transmit and/or receive antenna elements, and frequency spreading where the same data is spread over different channels distinguished by their sub-carrier frequency.

At the receiver, the detection of the symbols is performed utilising knowledge of the complex channel attenuation and phase shifts: the Channel State Information ('CSI'). The Channel State Information is obtained at the receiver by measuring the value of pilot signals transmitted together with the data from the transmitter. The knowledge of the channel enables the received signals to be processed jointly according to the Maximum Ratio Combining technique, in which the received signal is multiplied by the Hermitian transpose of the estimated channel transfer matrix.

Two broad ways of managing the transmit diversity have been categorised as 'closed loop' and 'open loop'.

Two closed loop methods are described in the paper entitled "Transmit adaptive array without user-specific pilot for 3G CDMA" by B. Raghothaman et al., that appeared in the IEEE Transactions 2000. In the systems described in this paper, the signals transmitted over the different transmit antenna elements of the base station are weighted according to relative weights calculated at the receiver from Channel State Information and retransmitted to the transmitter. In one system referred to, pilots specific to each user are transmitted in addition to the pilots for each transmit antenna element that are common to all users, which penalises the communication capacity of the system. In another system disclosed in the paper, user-specific pilots are avoided by re-modulating the detected signals using the measured Channel State Information and the calculated weights and using the re-modulated signals to correct errors in feedback; this imposes a heavy computational load on the receiver and the result is only reliable if the channel state estimation is sufficiently correlated with the actual channel state to avoid a high detection error rate.

In pure 'open loop' methods, no Channel State Information is fed back to the transmitter. In such systems, the transmitter comprises a plurality of transmit antenna elements; the data is encoded in symbol blocks, the symbols of a block being permuted between the transmit antenna elements over time with respective replications and complex conjugations and/or negations. The complexity of the receiver depends on the properties of the matrix that defines this space-time block code; in particular detection is performed with a low cost in terms of simplicity of the receiver computations if this matrix is an orthogonal one. Orthogonal matrices are well known: definitions are given in textbooks such as 'Matrix Computations' by Gene H. Golub and Charles F. Van Loan, $3^{rd}$ Edition, published by Johns Hopkins. See page 69 (for a set of vectors) or page 208 (for a matrix).

An open loop system using an orthogonal detection matrix is described in International Patent Application Publication No WO 99/14871 Alamouti. In this system, the symbols of a block transmitted are permuted between the transmit antenna elements over time with respective replications and complex conjugations and/or negations according to a scheme, known as the 'Alamouti code', such that the received signal is detectable at the receiver using an orthogonal detection matrix scheme.

The performance of the code is mainly based on the diversity order of the code. This diversity order characterizes the number of transmit and receive antennas which is actually seen by the code. For a given number of receive antenna elements, the more transmit antenna elements are used the more improvement is obtained in terms of fading and interference is obtained. However, the paper entitled "Space-Time Block Codes from Orthogonal Designs" by V. Tarokh et al. that appeared in IEEE Transactions on IT, vol. 45, Jul. 1999, states that an orthogonal detection code matrix can not be used if the transmitter comprises more than two transmit antenna elements with full diversity without sacrificing the coding rate, that is to say the useful data rate for the user. They propose coding rates of ½ for three to eight transmit antenna elements or ¾ for three or four transmit antenna elements.

Patent specification WO 00/51265, Whinnett et al., assigned to Motorola, describes another transmit diversity system, in which code rate is maintained for arrays of more than two transmit antenna elements but at the expense of sub-optimal transmit diversity.

Another transmit diversity scheme (ABBA code) is described for more than two transmit antenna elements in the paper entitled "Minimal Non-Orthogonality Rate 1 Space-time Block Code for 3+Tx Antennas" by O. Tirkkonen et al. IEEE $6^{th}$ Int. Symp. On Spread-Spectrum Tech. & Appli., NJIT, pp. 429-432, September 2000. This coding rate 1 scheme is derived from the permutation of two Alamouti codes as described by the code matrix $$\begin{bmatrix} A & B \\ B & A \end{bmatrix}$$

It is stated that the ABEA code provides full spatial diversity to the detriment of the orthogonality of the detection matrix, which implies that the computational cost of the detection step is increased compared to an orthogonal scheme. In addition the performance of the ideal code is not fully achieved by the ABBA code due to the interference terms of the detection matrix.

Other compromises are proposed in a paper presented by H. Jafarkhani to the IEEE Wireless Communications and Networking Conference in September 2000 with non-orthogonal detection matrices that are stated not to achieve simultaneously the optimum diversity and transmission rate, two encoding schemes proposed being of the kind described by the code matrices $$\begin{bmatrix} A & B \\ B^* & -A^* \end{bmatrix} \text{ and } \begin{bmatrix} A & B \\ -B^* & A^* \end{bmatrix}.$$

Yet another compromise is described in the paper "A randomization technique for non-orthogonal space-time code blocks" by A Hottinen et al. appearing in IEEE VTC 2001. However, this system still does not employ an orthogonal detection matrix with full diversity for more than two transmit antenna elements.

Still another compromise is described in the paper "A space-time coding approach for systems employing four transmit antennas" by C. B. Papadias et al. presented at an IEEE conference in 2001 and that proposes an encoding scheme of the kind $$\begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}.$$

This scheme also uses a non-orthogonal detection matrix that does not achieve simultaneously the optimum diversity and transmission rate.

SUMMARY OF THE INVENTION

The present invention provides a method of transmitting data from a transmitter to a remote receiver using transmit diversity wireless communication and a system, a transmitter and a receiver as claimed in the accompanying claims.

DETAILED DESCRIPTION OF THE PREFERRED EMBODIMENTS

Figure 1:
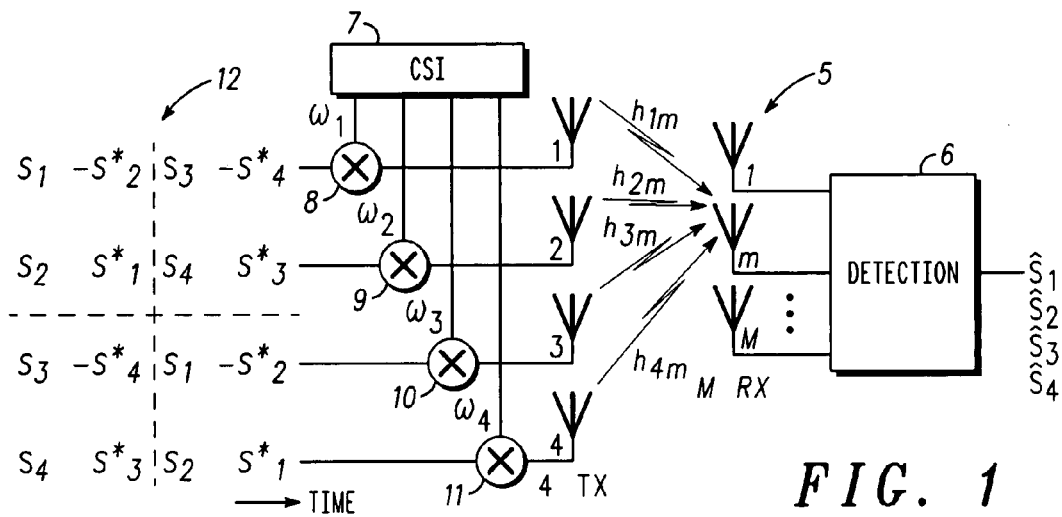
FIG. 1 is a schematic diagram of a system for transmitting data by transmit diversity wireless communication in accordance with an embodiment of the invention.

FIG. 1 shows a first embodiment of a system for transmitting data by a transmit diversity wireless communication network, the system comprising a first station that will be described as the transmitter side (with primary reference to its transmission function) and a second station that will be described as the receiver side (with primary reference to its reception function). In the present case, the first station and the second station are both capable of both transmission and reception and, moreover, the same antenna elements are used both for transmission and reception in the preferred embodiment of the invention.

The transmitter side comprises four transmit antenna elements, 1, 2, 3, 4. The receiver side of the system comprises an array 5 of M receive antenna elements. The number of antenna elements 5 on the receiver side is chosen on the basis of economical considerations to provide increased channel diversity; in the case of mobile telephony, a single base station serves many hundreds or even thousands of mobile units and it is therefore more economical to add antenna elements to the base station than to the mobile units. In the case of a local area network ('LAN'), for example, the cost of the remote stations is less critical and a higher number of antennas will be chosen on the receiver side.

Each transmit antenna element 1 to 4 transmits over a variety of paths to each of the receive antenna elements 5. Thus, considering the $m^{th}$ receive antenna element out of a total of M, each of the transmit antenna elements 1 to 4 transmits to the receive antenna element m over a variety of paths due to multiple reflections and scattering, which introduce complex multi-path fading; however, for simplification, the processing of the signals at the receiver is described and illustrated as if they were subject to flat fading (equivalent to transmission over a single path with no inter-path interference) that can be represented by a complex channel transfer coefficient $h_{1m}$ to $h_{4m}$.

In operation, symbols $s_1$, $s_2$, $s_3$, $s_4$ are derived from the data to be transmitted and applied to the transmit antennas 1, 2, 3 and 4. The receiver side of the system comprises a detector 6 which receives signals from the receive antenna element array 5 and detects the symbols $s_1$ to $s_4$ from the receive antenna elements.

On the transmit side of the system, a channel state information unit extracts weights $w_1$, $w_2$, $w_3$ and $w_4$ that are, in general terms, a complex function of the channel transfer coefficients $h_1$, $h_2$, $h_3$, and $h_4$ for each of the transmit antenna elements 1, 2, 3, 4. Before transmission, the signal to be transmitted from each of the antenna elements 1 to 4 is multiplied by the respective weight $w_1$ to $w_4$. The weight is again a complex coefficient, which is a function of the transfer channel coefficient and hence the signal may be modified in phase and/or amplitude as a function of the channel state information.

The data symbols to be transmitted are encoded in symbol blocks and the symbols are permuted over time within each block between the transmit antenna elements 1 to 4 with respective replications and complex conjugations and/or negations, so that the received signal is detectable at the receiver side using an orthogonal detection matrix scheme. The encoding scheme matrix for the symbol blocks is shown at 8 in FIG. 1.

The symbols $s_1$ to $s_4$ are permuted over the transmit antenna elements a number of times which is a power of 2, the power being greater than or equal to 2, the block comprising four permutations in the present case. It is also possible for the transmitter to include three antenna elements, the block of symbols preferably comprising four permutations in this case also. A higher number of permutations may also be utilised but will prolong the symbol block transmission.

As shown in FIG. 1, the symbols within each block are permuted in pairs within respective subsets of the symbols and transmitted over corresponding subsets of the transmit antenna elements 1 to 4, the subsets of symbols subsequently being permuted between the subsets of the transmit antenna elements. Thus, as shown in FIG. 1, symbols $s_1$, $s_2$ are transmitted initially over transmit antenna elements 1, 2 and symbols $s_3$, $s_4$ are transmitted initially over transmit antenna elements 3, 4. In the next step, the negation and conjugation of the symbol $s_2$ is transmitted over the transmit antenna element 1 and the conjugation of the symbol $s_1$ is transmitted over the transmit antenna element 2, the negation and conjugation of the symbol $s_4$ being transmitted over the transmit antenna element 3 and the conjugation of the symbol $s_3$ being transmitted over the transmit antenna element 4. It will be understood that the symbols $s_1$ and $s_2$ and their negations and/or their conjugations constitute a first subset of symbols that is transmitted over the subset of transmit antenna elements 1 and 2 with permutations and the symbols $s_3$ and $s_4$ with their negations and/or conjugations are transmitted over the subset of transmit antenna elements 3 and 4 with permutations. In the next step, the subset including symbols $s_3$ and $s_4$ is transmitted over the subset of transmit antenna elements 1 and 2 with permutations while the subset of symbols $s_1$, $s_2$ is transmitted over the subset of transmit antenna elements 3 and 4 with permutations.

This encoding scheme is a scheme of the kind ABBA. This embodiment of the present invention enables this encoding scheme to be decoded by an orthogonal detection matrix scheme at the receiver. It is also possible for other encoding schemes of analogous nature to be decoded using an orthogonal detection matrix scheme, for instance ABB*-A*, or AB-B*A*. Moreover, the space-time code has an overall coding rate of one (that is to say that the data rate is as high as in a single antenna case) and the system derives full benefit from the spatial diversity of the multiple transmit and receive antenna elements at the transmitter and receiver. The fact that the detection scheme uses an orthogonal matrix enables the detection to be performed with low computational cost. Interference terms that would be present with a non-orthogonal detection matrix scheme are substantially cancelled out by the application of the weights $w_1$ to $w_4$ to the signals transmitted as a function of the estimated channel transfer functions.

The signal $Y_m$ received by the $m^{th}$ antenna over four time instants within the symbol block can be written as $$\begin{bmatrix} y_{m,1} \\ y^*_{m,2} \\ y_{m,3} \\ y^*_{m,4} \end{bmatrix} = \begin{bmatrix} h_{1m}w_1 & h_{2m}w_2 & h_{3m}w_3 & h_{4m}w_4 \\ h^*_{2m}w^*_2 & -h^*_{1m}w^*_1 & h^*_{4m}w^*_4 & -h^*_{3m}w^*_3 \\ h_{3m}w_3 & h_{4m}w_4 & h_{1m}w_1 & h_{2m}w_2 \\ h^*_{4m}w^*_4 & -h^*_{3m}w^*_3 & h^*_{2m}w^*_2 & -h^*_{1m}w^*_1 \end{bmatrix} \begin{bmatrix} s_1 \\ s_2 \\ s_3 \\ s_4 \end{bmatrix} + \begin{bmatrix} b_{m,1} \\ b^*_{m,2} \\ b_{m,3} \\ b^*_{m,4} \end{bmatrix} \quad \text{Equation 1}$$

$$\underbrace{\phantom{\begin{bmatrix}y\\y\\y\\y\end{bmatrix}}}_{Y_m} \quad \underbrace{\phantom{\begin{bmatrix}h&h&h&h\\h&h&h&h\\h&h&h&h\\h&h&h&h\end{bmatrix}}}_{H_m} \quad \underbrace{\phantom{\begin{bmatrix}s\\s\\s\\s\end{bmatrix}}}_{S} \quad \underbrace{\phantom{\begin{bmatrix}b\\b\\b\\b\end{bmatrix}}}_{B_m}$$

where $y_{m,1}$ to $y_{m,4}$ represent the signals received from the transmit antenna elements 1 to 4 respectively, $H_m$ represents the matrix obtained by multiplying the channel transfer functions by the corresponding weights applied to the transmit antenna elements, S represents the symbols $s_1$ to $s_4$ transmitted from the transmit antenna elements 1 to 4 respectively, $b_{m,1}$ to $b_{m,4}$ represent the noise and interference at the $m^{th}$ receive antenna element and $B_m$ represents the received noise matrix. In this equation, the minus sign represents the negation of the corresponding value and the asterisk sign represents the conjugate of the value.

These multiple received signals are processed at the receiver according to the Maximum Ratio Combining technique. That is to say, the received pilot signals for each transmit antenna element are measured in order to estimate the channel transfer coefficients $h_{1m}$ to $h_{4m}$ and the weights applied at the transmitter side $w_1$ to $w_4$ and the Hermitian transposes $\hat{H}_m^H$ of the estimated channel transfer coefficient matrices for each receive antenna element m are calculated. The received symbol blocks $Y_m$ are multiplied by the corresponding Hermitian transposes $\hat{H}_m^H$ and the resulting multiplied signals are summed over the antennas, and we finally get a new signal Z such that $$Z = \sum_{m=1}^{M} \hat{H}_m^H Y_m = \left(\sum_{m=1}^{M} \hat{H}_m^H H_m\right) S + \sum_{m=1}^{M} \hat{H}_m^H B_m. \quad \text{Equation 2}$$

Provided that the channel estimation is sufficiently accurate and the weights actually applied to the signals to be transmitted also correspond accurately to the calculated weights, the resulting detection matrix $$\sum_{m=1}^{M} \hat{H}_m^H H_m$$

corresponds with a sufficient degree of approximation to the detection matrix of the ideal orthogonal rate 1 code scheme for proper detection of the data, that is to say $$\sum_{m=1}^{M} H_m^H H_m = \begin{bmatrix} A & 0 & 0 & 0 \\ 0 & A & 0 & 0 \\ 0 & 0 & A & 0 \\ 0 & 0 & 0 & A \end{bmatrix} \text{ where } A = \sum_{m=1}^{M} \sum_{n=1}^{4} |h_{nm}|^2, \quad \text{Equation 3}$$

if the transmit weights satisfy at least approximately the following relation:

$$\mathfrak{R}\left\{\sum_{m=1}^{M} h^*_{1m} h_{3m} w^*_1 w_3 + \sum_{m=1}^{M} h^*_{2m} h_{4m} w^*_2 w_4\right\} = 0. \quad \text{Equation 4}$$

where $h_{nm}$ is the channel transfer coefficient of the channel between the $n^{th}$ transmit antenna element and the $m^{th}$ receive antenna element, $w_n$ is the weight applied to the signal of the $n^{th}$ transmit antenna element and $\mathfrak{R}$ represents the real part of the value on which it operates.

Due to the orthogonality of the code scheme, the detection step can then be performed with a low computational cost.

Several sets of transmit weights may be used to solve this equation in accordance with this embodiment of the present invention. One example consists in choosing the four weights such that $$w_1 = 1$$

$$w_2 = 1$$

$$w_3 = \exp\left(j\left[\text{angle}\left(\sum_{m=1}^{M} h_{1m} h_{3m}^*\right) + \pi/2\right]\right)$$

$$w_4 = \exp\left(j\left[\text{angle}\left(\sum_{m=1}^{M} h_{2m} h_{4m}^*\right) + \pi/2\right]\right).$$

Equation 5

With this choice of weights, it is sufficient for the transmitting side to obtain phase information for the weighting operation on two out of the four transmit antenna elements, which reduces the amount of feedback information to be transmitted from the receiver side if the channel state information is measured at the receiver side, for example.

The detection scheme for three emitting antennas can easily be derived from this four antenna coding scheme. Four complex symbols are transmitted from three antennas over four time instants, for instance by turning off the $4^{th}$ antenna, which corresponds to set $h_{4m}=0$ in the previous equations. In this case the overall space-time scheme is an orthogonal one if and only if the transmit weights satisfy:

$$\Re\left\{\sum_{m=1}^{M} h_{1m}^* h_{3m} w_1^* w_3\right\} = 0,$$

Equation 6 for instance by choosing $$w_1 = w_2 = 1 \text{ and } w_3 = \exp\left(j\left[\text{angle}\left(\sum_{m=1}^{M} h_{1m} h_{3m}^*\right) + \pi/2\right]\right).$$

Equation 7

With this choice of weights, it is sufficient for the transmitting side to obtain phase information the weighting operation on one only out of the three transmit antenna elements.

The above conditions for the weighting scheme to enable decoding by an orthogonal detection matrix are applicable to an encoding scheme of the kind 'ABBA', that is to say where sub-sets A and B of symbols $s_1$, $s_2$ and $s_3$, $s_4$ and conjugated symbols $s_1^*$, $s_2^*$ and $s_3^*$, $s_4^*$ and/or negated conjugated symbols $-s_1^*$, $-s_2^*$ and $-s_3^*$, $-s_4^*$ symbols are permuted over time between sub-sets 1, 2 and 3, 4 of antenna elements without negation nor conjugation of the symbol sub-sets, according to the matrix $$\begin{bmatrix} A & B \\ B & A \end{bmatrix}.$$

Other encoding schemes may be utilised of the form $$\begin{bmatrix} A & B \\ B^* & -A^* \end{bmatrix} \text{ or } \begin{bmatrix} A & B \\ -B^* & A^* \end{bmatrix} \text{ or } \begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}.$$

In the absence of weighting before transmission, these encoding schemes would leave interference terms that would require a detection matrix $$\sum_{m=1}^{M} H_m^H H_m$$

that is non-orthogonal.

In order to be able to detect the signals using an orthogonal detection matrix, in accordance with another embodiment of the present invention the weighting applied to the signals to be transmitted are derived such that $$\Re\left\{\sum_{m=1}^{M} h_{pm}^* w_p^* h_{rm} w_r \pm \sum_{m=1}^{M} h_{qm}^* w_q^* h_{sm} w_s\right\} = 0.$$

Equation 8

In a preferred realization of this embodiment, $$\begin{cases} w_p = w_q = 1 \\ w_r = \exp\left(j \times \left[\text{angle}\left\{\sum_{m=1}^{M} h_{pm} h_{rm}^*\right\} + \pi/2\right]\right) \\ w_s = \exp\left(j \times \left[\text{angle}\left\{\sum_{m=1}^{M} h_{qm} h_{sm}^*\right\} + \pi/2\right]\right) \end{cases}$$

Equation 9

In accordance with yet other embodiments of the present invention, in equation 8, $$\Im\left\{\sum_{m=1}^{M} h_{pm}^* w_p^* h_{rm} w_r \pm \sum_{m=1}^{M} h_{qm}^* w_q^* h_{sm} w_s\right\} = 0$$

Equation 10 where $\Im$ represents the imaginary part of the value it operates and the scheme is decodable using an orthogonal detection matrix.

Preferably, $$\begin{cases} w_p = w_q = 1 \\ w_r = \exp\left(j \times \text{angle}\left\{\sum_{m=1}^{M} h_{pm} h_{rm}^*\right\}\right) \\ w_s = \exp\left(j \times \text{angle}\left\{\sum_{m=1}^{M} h_{qm} h_{sm}^*\right\}\right) \end{cases}$$

Equation 11

Figure 2:
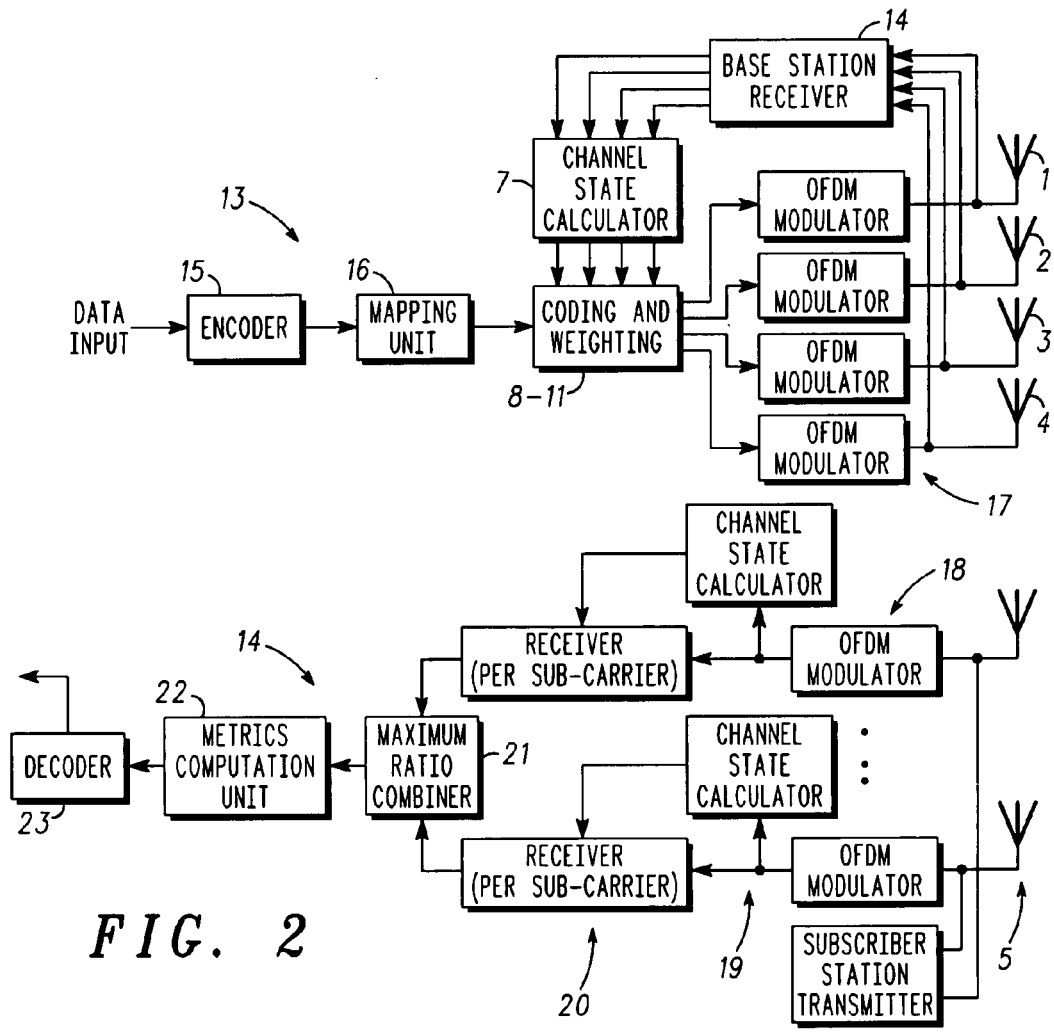
FIG. 2 is a schematic diagram of a system in accordance with FIG. 1 applied to a time division duplex (TDD), orthogonal frequency division multiplex (OFDM) system.

FIG. 2 shows the application of a system in accordance with FIG. 1 to a time division duplex (TDD) system based on orthogonal frequency division multiplexing (OFDM) modulation, as specified for example in the Hiperlan/2 standard of the ETSI but modified to include the space-time transmit diversity system of the embodiment of the present invention shown in FIG. 1. The embodiment of the invention shown in FIG. 2 has four transmit aerials at the base station, but it is also possible for the base station to have three transmit aerials. The base station of the system is shown at 13 and one of a number of subscriber units is shown at 14.

At the base station 13, data is input to the encoder 15 where it is encoded to include error correction information. The resulting data train is supplied to a data-mapping and block coding unit that forms the data train into symbols and performs the negation and conjugation operations to produce the symbol blocks according to the encoding scheme 12. The data from the mapping and block coding unit 16 is supplied to the multipliers 8, 9, 10 and 11 where, for each sub-carrier of frequency f, it is multiplied by respective complex weighting coefficients $w_{1f}$ to $w_{4f}$ and applied to respective elements of an array of OFDM modulation units that feed the transmit antennas 1 to 4. It is also possible to apply interleaving of the data after the encoder 15.

Pilot signals are included in the transmitted signals for each transmit antenna element, without weighting, to enable estimation of the downlink channels. A permutation signal is also added that is indicative of the number of permutations in a symbol block. For example, especially during deployment of the present invention, there may be a mix of base stations with only two transmit antenna elements and therefore two permutations per symbol block and base stations in accordance with the present invention with more than two transmit antenna elements and therefore more than two permutations per symbol block. The permutation signal takes a distinctive value, at least in the latter case, to enable the receiver to adapt the number of permutations performed in detecting the signal to the number made in the transmitted signal.

The channel state information is calculated in the calculator 7 at the base station from a similar pilot signal included in the uplink transmissions from the respective subscriber unit 14 and received at the base station over the antenna elements 1, 2, 3 and 4 and detected by the receiver unit 14 of the base station; since the system is a time division duplex system with the same carrier frequencies used for the downlink and the uplink, the measurements made on the uplink pilot are considered to be a sufficient approximation to the state of the downlink signal.

At the subscriber unit 14, the transmitted signals are received over the array of receive antenna elements 5, which are also used for transmission of signals back to the base station. The received signals are demodulated in respective OFDM channel demodulators 18. The channel transfer coefficients are estimated by an array of channel estimators 19 from the downlink pilot signal and applied to respective receiver elements of an array 20, together with the permutation signal that indicates the number of permutations to be performed in detecting the symbols. The receiver elements of array 20 calculates the Hermitian transform $\hat{H}_m^H$ of the channel transfer matrix, which it uses to multiply the received signals in the array of receivers 20.

The processed signals from the array of receivers 20 are applied to the maximum ratio combination summer 21 that adds the signals from the receiver array 20 over the antenna elements 5. Because of the transmit weights $w_1$ to $w_4$ applied at the transmitter, the detection matrix scheme is an orthogonal matrix. The signal from the maximum ratio combiner 21 is passed to a matrix computation unit 22 that recovers the digital signal train from the symbol blocks. The digital signal train is passed to a decoder 23 that applies the error correction process and recovers the data.

The system described with reference to FIG. 2 is a time division duplex system utilising orthogonal frequency division multiplexing. This enables the weighting of the transmit channels to be calculated at the base station using measurement of a pilot signal in the uplink signal transmitted from the subscriber station as an approximation for the channel state information of the downlink signal transmitted from the base station. Since the same antenna elements both at the base station and at the subscriber station are used for reception and transmission, this approximation is valid, and, indeed, the approximation is also valid in certain circumstances even where the antenna elements used for transmission and reception are not identical for the uplink and downlink.

Figure 3:
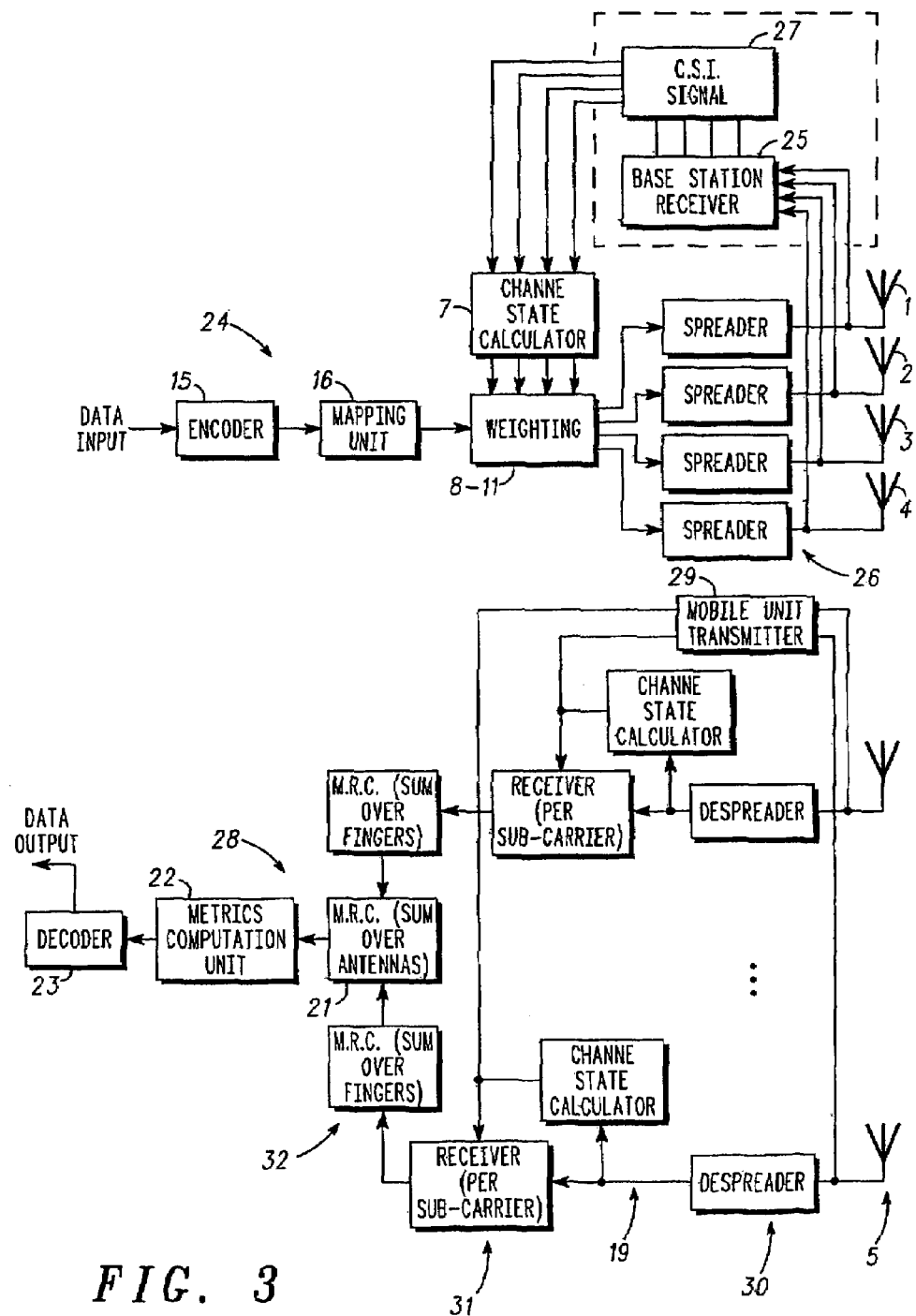
FIG. 3 is a schematic diagram of a system in accordance with FIG. 1 applied to a frequency division duplex (FDD), code division multiple access (CDMA) system

The system shown in FIG. 3 is a frequency division duplex system based on the CDMA (code division multiple access) standards with a modification to provide some feedback information from the mobile units to the base station to provide some channel state information concerning the downlink signal. Such a system is compatible with the 3GPP or 3GPP2 standard if an adaptation to the standard were introduced to accommodate the channel state information fed back from the mobile unit to the base station.

Referring now to FIG. 3 in more detail, the base station comprises a transmitter part shown generally at 24 and a receiver part 25. Input data, together with a pilot signal and a permutation signal indicative of the number of permutations made during the space-time transmit diversity permutations is applied to the encoder 15. The encoder 15 includes error correction data and the resulting signal is applied to the data mapping and block coding unit 16 that assembles the train of digital data into symbol blocks with permutations, negations and conjugations according to the encoding scheme. Multipliers 8 to 11 then multiply the data signals by respective weights for the respective antenna elements 1, 2, 3 and 4. In accordance with the CDMA specifications, the signals are spread over different frequency sub-carrier bands before transmission by an array of spreaders 26.

In the present embodiment of the invention, the channel state information is calculated at the mobile unit and transmitted back to the base station on the uplink over the same antenna elements as used for the downlink. In the preferred embodiment, the parameters as in equations 9 or 10 for the weights $w_1$ to $w_4$ to be applied to the multipliers 8 to 11 are calculated at the mobile unit and transmitted on the uplink to the base station, as this reduces the amount of feedback information passing over the communication link, being only a phase information for the weights $w_3$ and $w_4$ ($w_3$ only in the case of three transmit antenna elements), the weights $w_1$ and $w_2$ being constant values. The signals received at the base station antenna elements 1 to 4 are decoded in the receiver part 25 of the base station. The weighting information signal is extracted by a detector 27 and supplied to the channel state calculator 7 to calculate the weights applied to the multipliers 8 to 11.

The mobile unit comprises a receiver part indicated generally at 28 and a transmitter part 29. At the mobile unit, the signals transmitted are received on the antenna element array 5 and applied to a corresponding array of despreaders 30 that supply the base band signals to the array of receiver channel transfer function estimators at the mobile unit and to an array of receivers 31, each "finger" or signal received over a different transmission path being detected separately and the fingers being reassembled. The channel state information is calculated from a pilot signal transmitted by the base station. The channel state information is supplied on one hand to the mobile unit transmitter part 29 for retransmission to the base station in the uplink signal (which is at a different frequency from the downlink signal) and to the array of receiver elements 31.

The receiver elements multiply the signals from the despreaders array 30 by the coefficients of the Hermitian transform $\hat{H}_m^H$ of the channel transfer matrix obtained by permutation, transposition negation and conjugation operations on the channel state information signals, the number of permutations being defined by the received permutation signal. The resulting signals from each receiver antenna element are then summed over all fingers in an array of maximum ratio combiners 32 and further summed in a maximum ratio combiner 21 over the different antenna elements. Once again, the application of the transmit weights corresponding to equation 4 ensures that the detection matrix is an orthogonal matrix that enables the calculations to be greatly simplified. The symbols from the maximum ratio combiner 21 are applied to the matrix computation unit 22 and converted to a chain of digital signals and the decoder 23 detects and recovers the data with error detection.

In a preferred embodiment of this type of system, the transmitter part 29 of the mobile unit is similar to the transmitter part 24 of the base station in operation, and the receiver part 25 of the base station is similar to the receiver part 28 of the mobile unit. Adaptations are of course made to the number of antenna elements in the array 5 at the subscriber station. In this way, advantage is taken of the space-time transmit diversity performance of the present invention on the uplink from the subscriber unit to the base station as well as on the downlink from the base station to the mobile unit.

In another embodiment of the invention, the number of antenna elements applied at the mobile unit is reduced, for example to two antenna elements, with a view to reducing to the cost of the mobile unit. In this case, the spatial diversity is, of course, reduced compared to a system with four transmit antennas in the array 5.

The invention claimed is:

1. A method of transmitting data from a transmitter to a remote receiver using transmit diversity wireless communication, said transmitter comprising at least three transmit antenna, elements, the method comprising the step of encoding said data in symbol blocks, which includes modifying signals to be transmitted over at least one of said transmit antenna elements as a function of channel information at least approximately related to the channel transfer function of the transmitted signals ($h_1$, $h_2$, $h_3$, and $h_4$), such that the received signal can be detected at the receiver by a detection scheme using an orthogonal detection code matrix, the signals to be transmitted over at least one of said transmit antenna elements are modified so as to satisfy at least approximately the equation $$\Re\left\{\sum_{m=1}^{M} h_{1m}^* h_{3m} w_1^* w_3 + \sum_{m=1}^{M} h_{2m}^* h_{4m} w_2^* w_4\right\} = 0$$

or the equation $$\Re\left\{\sum_{m=1}^{M} h_{pm}^* w_p^* h_{rm} w_r \pm \sum_{m=1}^{M} h_{qm}^* w_q^* h_{sm} w_s\right\} = 0$$

where the complex number $h_{nm}$ represents the actual channel transfer function over the nth transmit antenna element and the math receiver transmit antenna element, the complex number $w_n$ represents the modification applied to the signals at the nth transmit antenna element, * represents the complex conjugate of the number associated therewith, $\Re$ represents the real part of a complex value, and $\Im$ represents the imaginary part of a complex value, and permuting the symbols (s1, s2, s3, s4) of a block between the transmit antenna elements over time with respective replications and complex conjugations and/or negations, permuting pairs of the symbols ($s_1$, $s_2$, $s_3$, $s_4$) within said symbol blocks over time within respective sub-sets of symbols and permuted symbols between the transmit antenna elements of respective sub-sets of said transmit antenna elements, and permuting said sub-sets of symbols and permuted symbols over time between said sub-sets of transmit antenna elements.

2. A method as claimed in claim 1, wherein said signals transmitted ever said transmit antenna elements are modified in phase as a function of said channel information.

3. A method as claimed in claim 1, wherein said channel information is a function of signals received at said receiver from said transmitter and is transmitted from said receiver to said transmitter.

4. A method as claimed in claim 1, wherein said receiver additionally comprises transmitting means for transmitting signals over channels similar to the transmit channels of said transmitter, and said transmitter additionally comprises receiving means including said transmit antenna elements for receiving signals transmitted from said transmitting means, characterized in that said channel information is calculated at said transmitter as a function of the channel transfer function of signals transmitted from said transmitting means to said receiving means.

5. A method as claimed in claim 1, wherein said symbols ($s_1$, $s_2$, $s_3$, $s_4$) are permuted over time within said block between the transmit antenna elements a number of times equal to a power of two, which power is greater than or equal to two.

6. A method as claimed in claim 4, wherein said transmitter comprises three or four of said transmit antenna elements and said symbols ($s_1$, $s_2$, $s_3$, $s_4$) are permuted over time within said block four times between the transmit antenna elements.

7. A method as claimed in claim 1, wherein said sub-sets of symbols and permuted symbols are permuted over time between said sub-sets of transmit antenna elements without conjugation or negation and said signals transmitted over at least one of said transmit antenna elements are modified so as to satisfy at least approximately the equation $$\Im\left\{\sum_{m=1}^{M} h_{pm}^* w_p^* h_{rm} w_r \pm \sum_{m=1}^{M} h_{qm}^* w_q^* h_{sm} w_s\right\} = 0$$

where the complex numbers $h_{1m}$, $h_{2m}$, $h_{3m}$ and $h_{4m}$ represent the actual channel transfer functions over the transmit antenna elements and the $m^{th}$ receiver transmit antenna element, the complex numbers $w_1$, $w_2$, $w_3$ and $w_4$ represent the modifications applied to the signals at the transmit antenna elements, $x^*$ represents the complex conjugate of the number x, and the operator $\Re$ represents the real part of a complex value.

8. A method as claimed in claim 1, wherein said transmitter comprises four of said transmit antenna elements and said signals transmitted over said transmit antenna elements are modified so as to satisfy at least approximately the equations $$w_1 = 1$$
$$w_2 = 1$$
$$w_3 = \exp\left(j\left[\text{angle}\left(\sum_{m=1}^{M} h_{1m}h_{3m}^*\right) + \pi/2\right]\right)$$
$$w_4 = \exp\left(j\left[\text{angle}\left(\sum_{m=1}^{M} h_{2m}h_{4m}^*\right) + \pi/2\right]\right)$$

where the complex number $h_{nm}$ represents the measured channel transfer function over the nth transmit antenna element and the math receiver antenna element, M represents the total number of receiver antenna elements at said receiver, the complex number $w_n$ represents the modification applied to the signals at the nth transmit antenna element, and $x^*$ represents the complex conjugate of the number x.

9. A method as claimed in claim 8, wherein values at least approximately related to $w_3$ and $w_4$ are calculated at said receiver as a function of received signals and transmitted from said receiver to said transmitter.

10. A method as claimed in claim 8, wherein said receiver additionally comprises transmitting means for transmitting signals over channels similar to the transmit channels of said transmitter, and said transmitter additionally comprises receiving means including said transmit antenna elements for receiving signals transmitted from said transmitting means, wherein values at least approximately related to $w_3$ and $w_4$ are calculated at said transmitter as a function of the channel transfer function ($h_1$, $h_2$, $h_3$, and $h_4$) of signals transmitted from said transmitting means to said receiving means.

11. A method as claimed in claim 1, wherein said transmitter comprises three of said transmit antenna elements and said signals transmitted over said transmit antenna elements are modified so as to satisfy at least approximately the equations $$w_1 = w_2 = 1, \text{ and } w_3 = \exp\left(j\left[\text{angle}\left(\sum_{m=1}^{M} h_{1m}h_{3m}^*\right) + \pi/2\right]\right)$$

where the complex number $h_{nm}$ represents the measured channel transfer function over the nth transmit antenna element and the math receiver antenna element, M represents the total number of receiver antenna elements at said receiver, the complex number $w_n$ represents the modification applied to the signals at the nth transmit antenna element, and $x^*$ represents the complex conjugate of the number x.

12. A method as claimed in claim 11, wherein a value at least approximately related to $w_3$ is calculated at said receiver as a function of received signals and transmitted from said receiver to said transmitter.

13. A method as claimed in claim 11, wherein said receiver additionally comprises transmitting means for transmitting signals over channels similar to the transmit channels of said transmitter, and said transmitter additionally comprises receiving means including said transmit antenna elements for receiving signals transmitted from said transmitting means, characterized in that a value at least approximately related to $w_3$ is calculated at said transmitter as a function of the channel transfer function ($h_1$, $h_2$, $h_3$, and $h_4$) of signals transmitted from said transmitting means to said receiving means.

14. A method as claimed in claim 1, wherein a permutation signal indicative of the number of permutations over time of said symbols ($s_1$, $s_2$, $s_3$, $s_4$) within said block is transmitted from said transmitter to said receiver and said receiver is responsive to said permutation signal in the numbers of permutations it performs in detecting the data transmitted.

15. A system for transmitting data by transmit diversity wireless communication, the system comprising a transmitter and a plurality of said remote receivers, wherein
said transmitter comprising at least three transmit antenna elements and transmit encoding means for encoding data in symbol blocks, said transmit encoding means being arranged for modifying signals transmitted over at least one of said transmit antenna elements as a function of channel information at least approximately related to the channel transfer function ($h_1$, $h_2$, $h_3$, and $h_4$) of the transmitted signals, such that the received signal can be detected at the receiver by a detection scheme using an orthogonal detection code matrix, said transmit encoding means being arranged to modify the signals transmitted over at least one of said transmit antenna elements so as to satisfy at least approximately the equation $$\Re\left\{\sum_{m=1}^{M} h_{pm}^* w_p^* h_{rm} w_r \pm \sum_{m=1}^{M} h_{qm}^* w_q^* h_{sm} w_s\right\} = 0$$

or the equation $$\Im\left\{\sum_{m=1}^{M} h_{pm}^* w_p^* h_{rm} w_r \pm \sum_{m=1}^{M} h_{qm}^* w_q^* h_{sm} w_s\right\} = 0$$

where the complex number $h_{nm}$ represents the actual channel transfer function over the nth transmit antenna element and the math receiver transmit antenna element, the complex number $w_n$ represents the modification applied to the signals at the nth transmit antenna element, * represents the complex conjugate of the number associated therewith, $\Re$ represents the real part of a complex value, and $\Im$ represents the imaginary part of a complex value, and
the encoding means being arranged to permute the symbols (s1, s2, s3, s4) of a block between the transmit antenna elements over time with respective replications and complex conjugations and/or negations, permute pairs of the symbols within said symbol blocks over time within respective sub-sets of symbols and permuted symbols between the transmit antenna elements of respective sub-sets of said transmit antenna elements, and said transmit encoding means is arranged to permute said sub-sets of symbols and permuted symbols over time between said sub-sets of transmit antenna elements.

16. A system as claimed in claim 14, wherein said receiver comprises means for calculating said channel information as a function of pilot signals received from said transmitter and for transmitting said channel information from said receiver to said transmitter.

17. A system as claimed in claim 14, wherein said receiver additionally comprises transmitting means for transmitting signals over channels similar to the transmit channels of said transmitter, and said transmitter additionally comprises receiving means including said transmit antenna elements for receiving signals transmitted from said transmitting means, wherein said transmit encoding means at said transmitter is responsive to the channel transfer function of pilot signals transmitted from said transmitting means to said receiving means to calculate said channel information.

18. A system as claimed in claim 15, wherein said encoding means is arranged to transmit a permutation signal indicative of the number of permutations over time of said symbols within said block and said receiver comprises detection means responsive to said permutation signal in the number of permutations it performs in detecting the data transmitted.

19. A transmitter for transmitting data to a remote receiver by transmit diversity wireless communication, comprising at least three transmit antenna elements and transmit encoding means for encoding data in symbol blocks, said transmit encoding means being arranged for modifying signals transmitted over at least one of said transmit antenna elements as a function of channel information at least approximately related to the channel transfer function ($h_1$, $h_2$, $h_3$, and $h_4$) of the transmitted signals, such that a received signal can be detected at a receiver by a detection scheme using an orthogonal detection code matrix, said transmit encoding means being arranged to modify the signals transmitted over at least one of said transmit antenna elements so as to satisfy at least approximately the equation $$\Re\left\{\sum_{m=1}^{M} h_{pm}^* w_p^* h_{rm} w_r \pm \sum_{m=1}^{M} h_{qm}^* w_q^* h_{sm} w_s\right\} = 0$$

or the equation $$\Im\left\{\sum_{m=1}^{M} h_{pm}^* w_p^* h_{rm} w_r \pm \sum_{m=1}^{M} h_{qm}^* w_q^* h_{sm} w_s\right\} = 0$$

where the complex number $h_{nm}$ represents the actual channel transfer function over the nth transmit antenna element and the math receiver transmit antenna element, the complex number $w_n$ represents the modification applied to the signals at the nth transmit antenna element, * represents the complex conjugate of the number associated therewith, $\Re$ represents the real part of a complex value, and $\Im$ represents the imaginary part of a complex value, and the encoding means being arranged to permute the symbols (s1, s2, s3, s4) of a block between the transmit antenna elements over time with respective replications and complex conjugations and/or negations, permute pairs of the symbols within said symbol blocks over time within respective sub-sets of symbols and permuted symbols between the transmit antenna elements of respective sub-sets of said transmit antenna elements, and said transmit encoding means is arranged to permute said sub-sets of symbols and permuted symbols over time between said sub-sets of transmit antenna elements.

20. A transmitter as claimed in claim 19, for transmitting data to a receiver additionally comprising transmitting means for transmitting signals over channels similar to the transmit channels of said transmitter, wherein said transmitter additionally comprises receiving means including said transmit antenna elements for receiving signals transmitted from said transmitting means, said transmit encoding means at said transmitter being responsive to the channel transfer function ($h_1$, $h_2$, $h_3$, and $h_4$) of signals transmitted from said transmitting means to said receiving means to calculate said channel information.

21. A transmitter as claimed in claim 19, wherein said encoding means is arranged to transmit a permutation signal indicative of the number of permutations over time of said symbols within said block.

22. A receiver for receiving data transmitted by transmit diversity wireless communication from a transmitter comprising at least three transmit antenna elements, said receiver comprises detection means for detecting data encoded in symbol blocks, from signals transmitted over at least one of said transmit antenna elements having been modified as a function of channel information at least approximately related to the channel transfer function ($h_1$, $h_2$, $h_3$, and $h_4$) of the transmitted signals such that a received signal can be detected at the receiver by a detection scheme using an orthogonal detection code matrix, said signals transmitted over at least one of said transmit antenna elements having been modified so as to satisfy at least approximately the equation $$\Re\left\{\sum_{m=1}^{M} h_{pm}^* w_p^* h_{rm} w_r \pm \sum_{m=1}^{M} h_{qm}^* w_q^* h_{sm} w_s\right\} = 0$$

or the equation $$\Im\left\{\sum_{m=1}^{M} h_{pm}^* w_p^* h_{rm} w_r \pm \sum_{m=1}^{M} h_{qm}^* w_q^* h_{sm} w_s\right\} = 0$$

where the complex number $h_{nm}$ represents the actual channel transfer function over the nth transmit antenna element and the math receiver transmit antenna element, the complex number $w_n$, represents the modification applied to the signals at the nth transmit antenna element, * represents the complex conjugate of the number associated therewith, $\Re$ represents the real part of a complex value, and $\Im$ represents the imaginary part of a complex value, and said detection means is arranged to detect symbols (s1, s2, s3, s4) of a block permuted between the transmit antenna elements over time with respective replications and complex conjugations and/or negations, pairs of the symbols within said symbol blocks permuted over time within respective sub-sets of symbols and permuted symbols between the transmit antenna elements of respective sub-sets of said transmit antenna elements and sub-sets of symbols and permuted symbols permuted over time between said sub-sets of transmit antenna elements.

23. A receiver as claimed in claim 22, wherein said detection means at said receiver comprises means for calculating said channel information as a function of signals received from said transmitter and for transmitting said channel information from said receiver to said transmitter.

24. A receiver as claimed in claim 22, wherein said detection means is responsive to a permutation signal indicative of the number of permutations over time of said symbols within said block, and which is transmitted from said transmitter to said receiver, in the numbers of permutations it performs in detecting the data transmitted.

* * * * *

UNITED STATES PATENT AND TRADEMARK OFFICE
CERTIFICATE OF CORRECTION

PATENT NO. : 7,308,035 B2  Page 1 of 1
APPLICATION NO. : 10/486474
DATED : December 11, 2007
INVENTOR(S) : Stephanie Pascale Rouquette It is certified that error appears in the above-identified patent and that said Letters Patent is hereby corrected as shown below:

Title Page item 54 and Col. 1

IN THE TITLE:

Delete "Transit" and insert --Transmit--

Signed and Sealed this

Thirty-first Day of March, 2009

JOHN DOLL
*Acting Director of the United States Patent and Trademark Office*